(12) United States Patent
Harb et al.

(10) Patent No.: US 12,028,428 B2
(45) Date of Patent: *Jul. 2, 2024

(54) TRACKING MEDIA CONTENT CONSUMED ON FOREIGN DEVICES

(71) Applicant: Rovi Guides, Inc., San Jose, CA (US)

(72) Inventors: Reda Harb, Issaquah, WA (US);
Rowena Young, Menlo Park, CA (US);
Edison Lin, Los Altos Hills, CA (US);
Mark Campagna, San Jose, CA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/141,627

(22) Filed: May 1, 2023

(65) Prior Publication Data

US 2023/0362269 A1 Nov. 9, 2023

Related U.S. Application Data

(63) Continuation of application No. 17/705,591, filed on Mar. 28, 2022, now Pat. No. 11,677,849, which is a
(Continued)

(51) Int. Cl.
*H04L 67/50* (2022.01)
*H04L 67/306* (2022.01)
(Continued)

(52) U.S. Cl.
CPC .......... *H04L 67/535* (2022.05); *H04L 67/306* (2013.01); *H04W 8/005* (2013.01); *H04W 4/80* (2018.02)

(58) Field of Classification Search
CPC ..... H04L 67/22; H04L 67/306; H04L 67/535; H04W 4/80; H04W 8/005
See application file for complete search history.

(56) References Cited

U.S. PATENT DOCUMENTS 8,880,648 B1 11/2014 Arora et al.
10,362,357 B1 7/2019 Bates et al.
(Continued)

FOREIGN PATENT DOCUMENTS

EP 2262262 A1 12/2010

OTHER PUBLICATIONS

"ISR and Written Opinion", International Search Report and Written Opinion of PCT/US2020/065062 dated Mar. 4, 2021.

*Primary Examiner* — Kostas J Katsikis
(74) *Attorney, Agent, or Firm* — Haley Guiliano LLP

(57) ABSTRACT

Methods and systems are described for tracking content consumed by a guest subscriber consuming content with a host subscriber. A host device accessing content transmits a discovery request to identify nearby devices. A guest device in the vicinity receives the discovery request and transmits a response to the host device. As content is played back on the host device, the guest device may receive a content identifier and a progress time from the host device. Using the content identifier and the progress time, a guest device may transmit a request to a server to update a viewing history or subscriber profile associated with the guest subscriber and/or device. A guest subscriber may later resume a program or series from where the content was left on his or her own home or mobile device(s). Communications between a host device and guest device may be direct or via network server and may be secured as private.

20 Claims, 7 Drawing Sheets

Related U.S. Application Data continuation of application No. 16/824,167, filed on Mar. 19, 2020, now Pat. No. 11,316,938.

(51) Int. Cl.
*H04W 8/00* (2009.01)
*H04W 4/80* (2018.01)

(56) References Cited

U.S. PATENT DOCUMENTS

| | | |
|---|---|---|
| 11,444,949 B1* | 9/2022 | Fletcher .................. H04L 63/20 |
| 2003/0083938 A1 | 5/2003 | Smith et al. |
| 2009/0100147 A1 | 4/2009 | Igarashi |
| 2013/0047083 A1* | 2/2013 | Sansom ............. H04N 21/4725 |
| | | 715/764 |
| 2014/0089992 A1 | 3/2014 | Varoglu et al. |
| 2015/0020105 A1 | 1/2015 | Roberts et al. |
| 2016/0077710 A1 | 3/2016 | Lewis et al. |
| 2016/0205506 A1 | 7/2016 | Turner et al. |
| 2016/0241721 A1 | 8/2016 | Soelberg et al. |
| 2018/0063263 A1 | 3/2018 | Bandela et al. |
| 2018/0176625 A1 | 6/2018 | Vossen |
| 2018/0213033 A1 | 7/2018 | Subbian |
| 2018/0352014 A1 | 12/2018 | Alsina et al. |
| 2019/0052926 A1 | 2/2019 | Waterman et al. |
| 2019/0208270 A1 | 7/2019 | Bates et al. |
| 2020/0077269 A1 | 3/2020 | Fawzy |
| 2020/0183807 A1 | 6/2020 | Moeller |
| 2021/0297496 A1 | 9/2021 | Harb et al. |
| 2022/0294870 A1 | 9/2022 | Harb et al. |

* cited by examiner

700

TRACKING MEDIA CONTENT CONSUMED ON FOREIGN DEVICES

CROSS-REFERENCE TO RELATED APPLICATIONS

This application is a continuation of U.S. patent application Ser. No. 17/705,591, filed Mar. 28, 2022, which is a continuation of U.S. patent application Ser. No. 16/824,167, filed Mar. 19, 2020, now U.S. Pat. No. 11,316,938, the disclosure of which are hereby incorporated by reference herein in their entireties.

BACKGROUND

The present disclosure relates to systems for providing content, and more particularly to systems and related processes for updating subscriber profiles for subscribers consuming content via devices not associated with their subscription.

SUMMARY

Devices may facilitate delivery of content for consumption. Content such as video, animation, music, audiobooks, ebooks, playlists, podcasts, images, slideshows, games, text, and other media may be consumed by users at any time, as well as nearly in any place. Abilities of devices to provide content to a content consumer are often enhanced with the utilization of advanced hardware with increased memory and fast processors in devices. Devices, such as computers, telephones, smartphones, tablets, smartwatches, speakers/microphones (e.g., with a virtual assistant), activity trackers, e-readers, voice-controlled devices, servers, televisions, digital content systems, video game consoles, and other internet-enabled appliances can provide and deliver content almost instantly.

Content delivery systems may use, for example, interactive content guidance applications to facilitate content consumption, as well as track a history of content items consumed over time. A content history, for instance, may include a list of all content consumed. A content history may be identified by other names, including a "viewing history" for video programs consumed, a "listening history" for audiobooks, podcasts, playlists or other audio content consumed, and/or a "browsing history." Content history may also be called "viewing activity," "watch history," "video history," or other designations to identify previously consumed programs and/or profiles. Typically, a viewing history is associated with a profile or an account such as a user profile, user account, subscriber profile, or subscriber account. As used herein, subscriber may be used as an equivalent to user account, viewer account, or other account with content provider systems and/or services. A viewing history may be stored as part of a user profile and may be referred to as a subscriber profile. With services such as some video-on-demand systems, where purchase or renting of content may be required, a viewing history may be stored as or with a purchase history or rental history.

A viewing history is valuable to a service and a subscriber. By tracking content consumed by a subscriber, an interactive content guidance application may quickly indicate which programs and episodes the subscriber has previously consumed, as well as content that is yet to be consumed. For instance, an interactive content guidance application may indicate the next television show in an episodic series, remove a completed movie from a watchlist, or suggest another program based on similarities (or differences) with previously consumed content.

For a content delivery service, tracking a viewing history generates valuable viewing data that can be used to validate providing (or removing) certain content from a catalog, to aid in content suggestion algorithms, and to provide statistical significance for new and/or existing programming.

Generally, the ability to add content to a viewing history is confined to consuming the content. For instance, a movie featured on a subscription streaming service may not be marked as "watched" until the movie is played in its entirety (or, e.g., playback has otherwise advanced until the credits), despite the movie being watched on a separate video-on-demand service months prior. This approach may improperly label content items that were partially consumed as unwatched or fully watched and misinform a subscriber as to which content was consumed or needs to be consumed. For instance, failing to finish the last 20 minutes of a movie may leave the movie marked as incomplete and require a subscriber to start at the beginning. On the other hand, failing to finish the last 20 minutes of a movie may leave the movie marked as complete and a subscriber may forget to complete the movie.

In some approaches, manually labeling a content item as watched may be possible. For instance, an interactive content guidance application may offer options for a selected program or content item to allow a subscriber to mark the content item as "watched," along with, e.g., a "favorite" or "add to watchlist." In this case, for example, if a subscriber has watched a movie in the theater prior to home release, the subscriber may update the viewing history via mobile device or a set-top box to include the movie. In some approaches, if a subscriber watches a program at a friend's house, his home device may keep suggesting that program because he did not manually enter it in the viewing history.

Additionally, a viewing history may include tracking content that is partially consumed. A viewing history may include a "continue watching list." For instance, a movie may be paused or stopped at 53 minutes, and a subscriber could be able to resume the movie from the 53-minute mark on another access point to the system (e.g., another subscriber device). In longer content that is not generally consumed all in one session, such as books or audiobooks, marking where the content is stopped is necessary to continue at a later time until the content is finished. Moreover, storing a stop-point (or pause location) timestamp in a cloud-accessible profile is necessary for, e.g., resuming on a portable device after initially consuming via a device such as a television. A user interface of an interactive content guidance application may depict a progress bar or timer to indicate how much of a content item has been consumed, as well as how much time remains.

Trick play (or trick mode) is a feature set for digital content systems, such as DVR or VOD, to facilitate time manipulation of content playback with concepts like pause, fast-forward, rewind, and other playback adjustments and speed changes. Trick play features typically function with interactive content guidance applications or other user interfaces. Some content playback systems utilize metadata that may divide content into tracks or chapters to perform a "next-track" or "previous-track" at a push of a button. Some content playback systems mimic functions of analogue systems and play snippets or images while "fast-forwarding" or "rewinding" digital content. Along with fast-forward at multiple, various speeds, systems may include a "skip-ahead" function to jump ahead, e.g., 10, 15, or 30 seconds, in content, to allow skipping of a commercial or redundant content. Along with rewind at multiple, various speeds, systems may include a "go-back" or "replay" function that would skip backwards, e.g., 10, 15, or 30 seconds, in content, to allow a replay.

Manipulating playback of content may be caused by input based on remote control, mouse, touch, gesture, voice or various other input. Performing trick play functions has traditionally been via remote control (e.g., a signal caused by a button-press of a remote control). Functions may be performed via manipulation of a touchscreen, such as adjustment of a slider bar to affect playback time and enable replay or skip-ahead functions. Voice recognition systems and connected virtual assistants may allow other playback functions, as such systems may have more versatility. As input mechanisms grow more sophisticated and allow additional input, playback and trick play functions evolve.

A viewing history may be stored in the cloud (e.g., a remote secure server) and accessed by interactive content guidance applications initiated by a subscriber (e.g., subscriber log-in). For example, a subscriber may view episodes 1 and 2 at home and episodes 3-5 via mobile device, and the interactive content guidance application may indicate that the subscriber has viewed episodes 1-5, regardless of device or location. In some cases, a subscriber may view the first 45 minutes of a movie on a living room television and the next 30 minutes on a bedroom television, and the electronic program guides (EPG) may indicate 1 hour and 15 minutes of the movie has been consumed. In such approaches, the viewer must be logged in as a subscriber, and the content status information may be updated as the content is streamed or consumed. There exists a need to track a viewing history for a viewer who is not necessarily the subscriber who is logged in. There exists a need to track a viewing history for guest subscribers consuming content with host subscribers.

One approach may be to have a guest subscriber also sign in with a host subscriber, and an interactive content guidance application may track and update both a host and guest's progress through content simultaneously. Such an approach may be redundant, time-consuming, and cause for privacy concerns.

One approach may be to have a guest subscriber track and update progress through content manually via a mobile device. Such an approach may allow a private log-in and connection, but separately updating viewing history and/or content progress may be time-consuming and prone to human error.

Described herein are various approaches for tracking content viewing history and/or consumption progress by a guest subscriber consuming content accessed by a host subscriber. Devices may be configured to monitor content consumption, share data between devices, and update viewing histories and subscriber profiles to effectively track viewing histories for guest subscribers consuming content via other subscribers' devices.

With many devices utilizing wireless connections such as Bluetooth, near-field communications, and/or Wi-Fi, data may be shared between a host device and a guest's mobile device. In some embodiments described herein, content description data may be passed between devices to enable updates to a corresponding subscriber's viewing history. For instance, a host device may need to share only information identifying a content item and a progress time, and a guest device could privately relay the information to one or more services to update progress in the guest's own profile. A guest device may send a discovery signal. A guest device may request a host device to send a discovery signal. A host device may send a discovery signal to identify if any guest devices are in the vicinity and/or within proximity.

In some embodiments described herein, a guest mobile device may be discovered by a host device such as a television. Each of the guest device and the host device may be using an interactive content guidance application configured to facilitate content delivery from one or more subscription streaming services. Such interactive content guidance applications may include a tracking engine that identifies progress of content consumed and can update viewing histories in respective subscription profiles. A tracking engine may keep a subscriber's information separate and private and update each viewing history individually. A tracking engine may securely encrypt and/or anonymize more than one subscriber's information and update multiple viewing histories in one request. A tracking engine may be able to access and update viewing histories for multiple subscription services. Such updating may be performed by an application accessing application programming interfaces (APIs) of multiple subscription services. For instance, a movie viewed for 40 minutes by a guest with a host subscriber to one service may be picked up by the guest at the proper time when the movie is viewed at home on another subscription service. This may help viewers complete unfinished content, e.g., when the content is carried by multiple subscription services.

For instance, by way of a non-limiting example, a guest may be watching a movie on a television at the home of a host, where both the guest and the host are subscribers to a subscription service providing the video. The host television may be enabled to send a discovery signal to determine if there are any guests watching by communicating with smartphones and/or identifying smartphones within range. In some embodiments, a discovery request may be initiated by a host device, a guest device, and/or a server. The guest may enable a mode for a guest smartphone to communicate with the television regarding the program identification and the progress, e.g., time, of each program the host and guest watch on the host television together. In some embodiments a "discovery mode" or "entertainment mode" may be enabled on a mobile device to allow discovery and/or communication on a local network or a created ad-hoc network. Using the program identification and the progress, the guest's smartphone can update the guest's subscriber profile to include the watched program(s) (and partially watched program(s)) in the guest subscriber's viewing history.

In some embodiments, a guest may be watching a movie on a host's tablet with the host, e.g., traveling on a train and viewing together, where both the guest and the host are subscribers to a subscription service providing the video. The guest may enable a mode, such as "discovery mode" or "entertainment mode," for a guest smartwatch to communicate with the host's tablet regarding the program identification and the progress of each program the host and guest watch on the host television together. Using the program identification and the progress, the guest's smartwatch can later access the internet and update the guest's subscriber profile to include the watched program(s) (and partially watched program(s)) in the guest subscriber's viewing history. In some embodiments, the guest's smartwatch may securely identify the guest subscriber to the host tablet so the tablet can request to update the guest subscriber's viewing history, e.g., when connected to the internet.

In some embodiments described herein, a guest device in the presence of a host device may receive a discovery request, via a wireless signal, and transmit a response. In some embodiments, a discovery request may be initiated by a host device. In some embodiments, a discovery request may be initiated by a guest device. A response to a discovery request may be part of a handshake to identify the protocols of communication. A response may identify a server in the cloud to use for secure communications. A response may indicate that the device has been configured to track and update content consumed on the host device. A discovery request and/or response may identify one or more subscription services. A response may identify the guest or the guest device or keep one or more private.

In some embodiments described herein, a host device may use a discovery signal to determine a guest device is within range and infer that a guest is present and consuming content. For example, a host device may emit a signal, such as Bluetooth, WiFi, radio frequency, and/or near-field communication signal, which, when received by a device and responded to, indicates that the receiving device is within range. Different wireless protocols may have different ranges and strength of signal may be adjustable in order to minimize discovery communications with, e.g., viewers consuming other content in a nearby room. As used herein, "communicative proximity" shall be defined as occurring when two or more devices are close enough together to be communicative over any suitable wired and/or wireless communication paths that rely on the devices being within a distance of one another (e.g., length of cabling, NFC, RFID, Bluetooth, etc.).

In some embodiments described herein, as content is consumed on a host device (or afterward), a guest device may receive a content identifier and a progress time from the host device. A host device may receive content from a content delivery server. The content may include a content identifier, e.g., as metadata, and, as the content is played back, the host device may generate a progress time based on playback. A host device may transmit content identification and progress time to a guest device via a local network or via a wider network and server. Using the content identifier and the progress time, a guest device may transmit a request to update a viewing history or subscriber profile associated with the guest device. Such a request may be sent to a server of a subscription streaming service or a server that may access (e.g., via API) one or more subscription streaming services.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
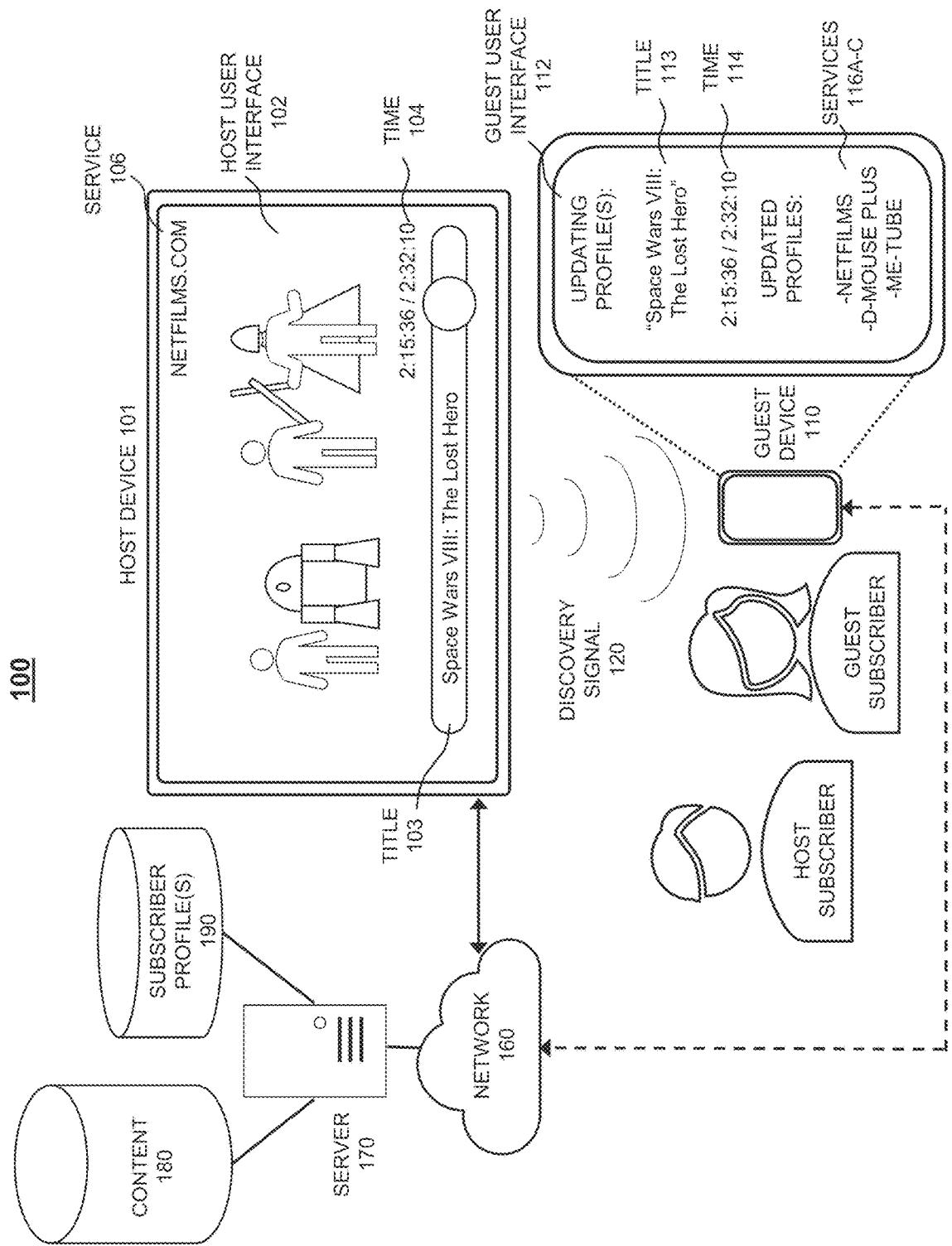
FIG. 1 depicts an illustrative scenario and user interfaces for tracking media content consumed as a guest, in accordance with some embodiments of the disclosure.

FIG. 1 depicts illustrative scenario 100 and user interfaces for tracking media content consumed as a guest, in accordance with some embodiments of the disclosure. Scenario 100 of FIG. 1 illustrates a content delivery system accessible by host device 101 and guest device 110 via network 160. In scenario 100, host device 101 is illustrated as a smart television and guest device 110 is illustrated as a smartphone. By way of a non-limiting example, scenario 100 may depict an updating of a guest subscriber's viewing history while the guest is consuming content on a host subscriber's television based on a communication between the guest's smartphone and the host's television.

Figure 6:
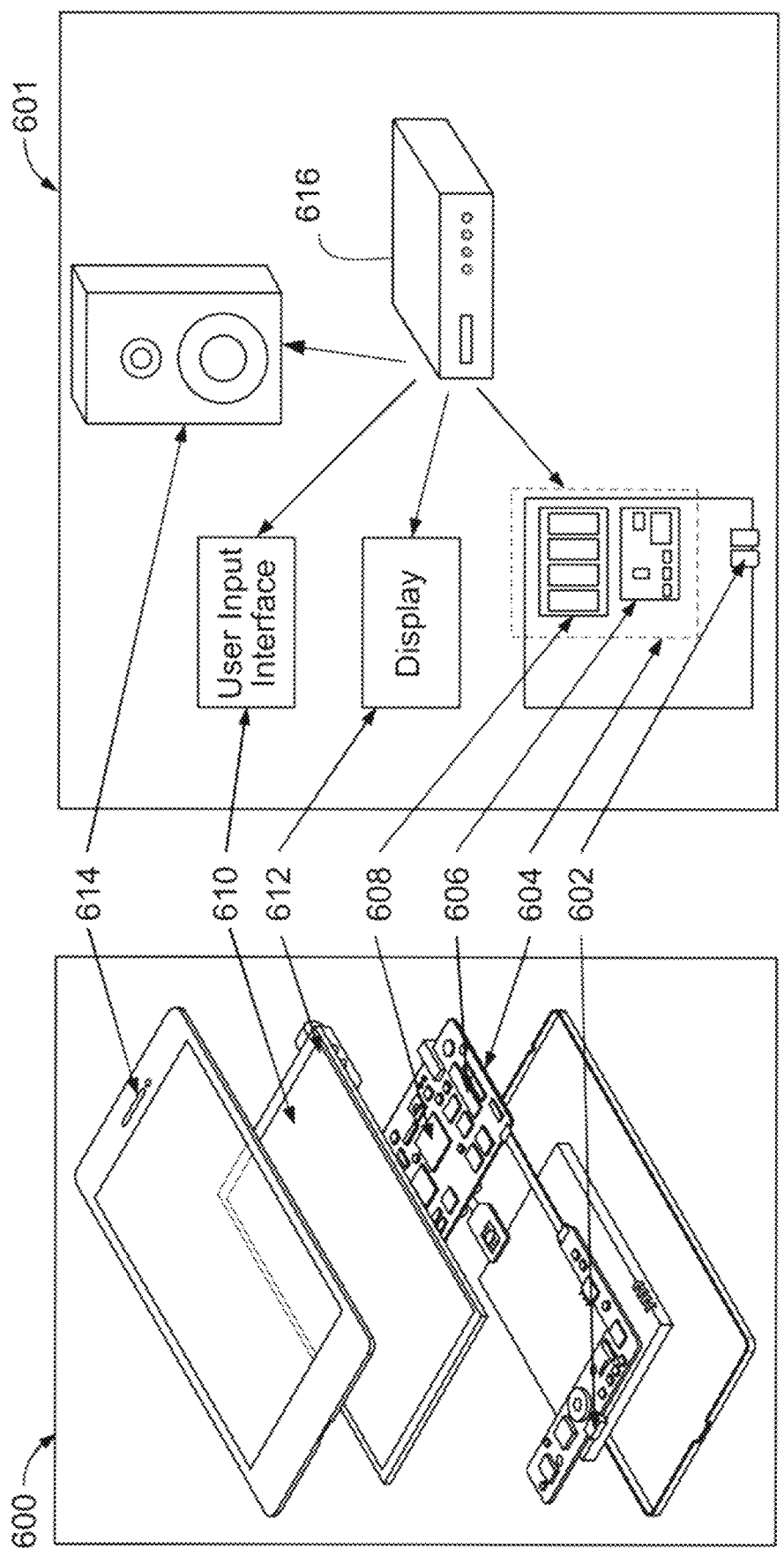
FIG. 6 is a diagram of an illustrative device, in accordance with some embodiments of the disclosure.
Figure 7:
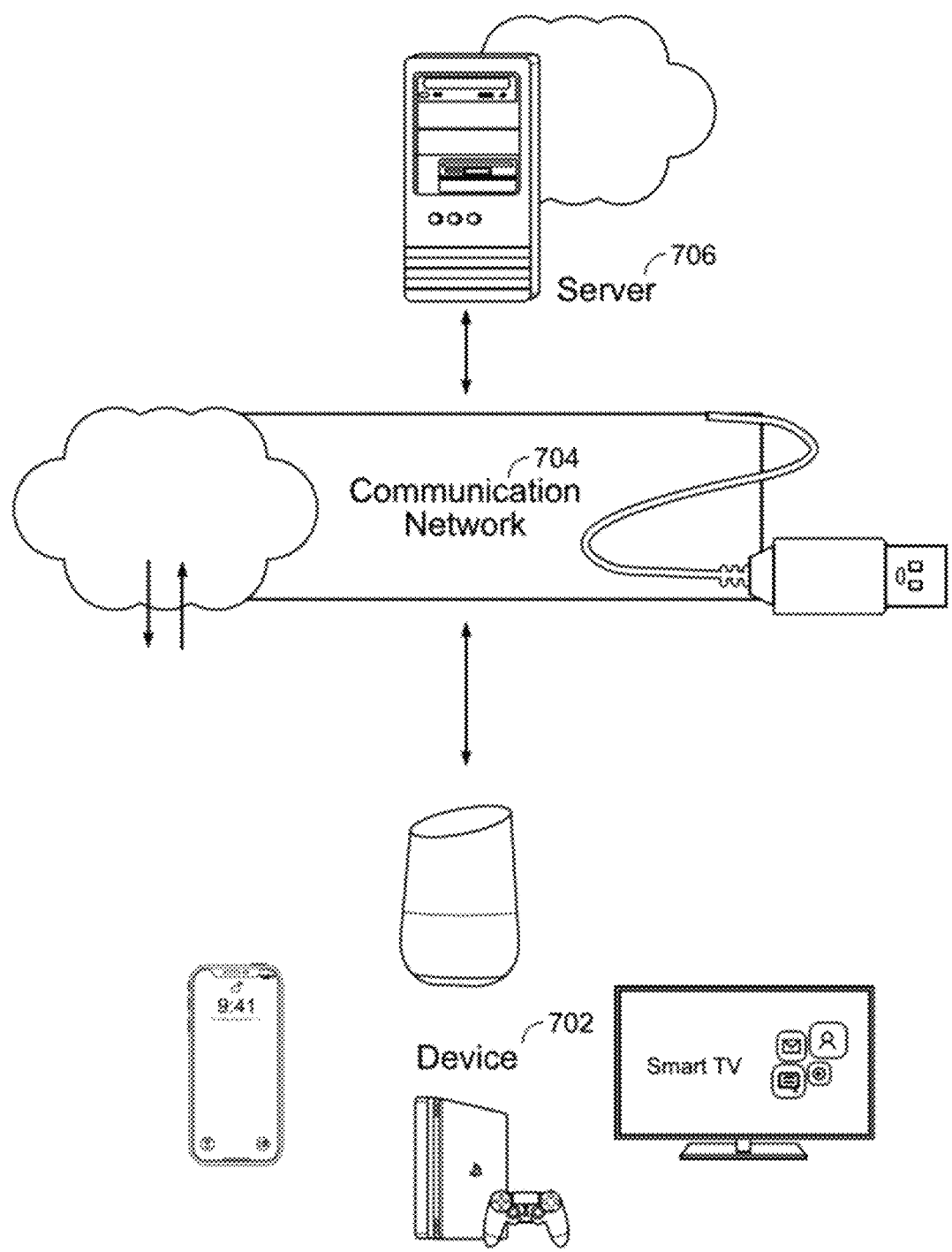
FIG. 7 is a diagram of an illustrative system, in accordance with some embodiments of the disclosure.

Each of host device 101 or guest device 110 may be any suitable device such as a television, personal computer, laptop, smartphone, tablet, media center, video console, or any device as depicted in FIGS. 6 and 7. Host device 101 or guest device 110 should have capabilities to receive input, communicate with a network, and provide content for consumption. Input for host device 101 or guest device 110 may be any suitable input interface such as a touchscreen, touchpad, or stylus and/or may be responsive to external device add-ons, such as a remote control, mouse, trackball, keypad, keyboard, joystick, voice recognition interface, or other user input interfaces. Some embodiments may utilize a tracking engine, e.g., as part of an interactive content guidance application, stored and executed by one or more of the processors and memory of host device 101 and/or guest device 110, to track media content consumed.

Interactive content guidance applications may take various forms, such as interactive television program guides, electronic program guides (EPG) and/or user interfaces, which may allow users to navigate among and locate many types of content, including conventional television programming (provided via broadcast, cable, fiber optics, satellite, internet (IPTV), or other modes) and recorded programs (e.g., DVRs) as well as pay-per-view programs, on-demand programs (e.g., video-on-demand systems), internet content (e.g., streaming media, downloadable content, webcasts, shared social media content, etc.), music, audiobooks, websites, animations, podcasts, (video) blogs, ebooks, and/or other types of media and content.

The interactive guidance provided may be for content available through a television, or through one or more devices, or may bring together content available both through a television and through internet-connected devices using interactive guidance. The content guidance applications may be provided as online applications (e.g., provided on a website), or as stand-alone applications or clients on handheld computers, mobile telephones, or other mobile devices. Various devices and platforms that may implement content guidance applications are described in more detail below.

As shown in scenario 100, host device 101 generates a graphical user interface, e.g., host user interface 102. In scenario 100, host user interface 102 displays content delivered via network 160 by server 170 from, e.g., content storage 180. Host interface 102 may display time 104, which indicates progress of 2:15:36 of the runtime 2:32:10. Host user interface 102 may display title 103, which, for example, indicates the content item's title is "Space Wars VIII: The Lost Hero." Host user interface 102 may display service 106 to indicate which content delivery system (e.g., a streaming service) is providing the content. In some embodiments, functionality of host user interface 102 may be enabled as a result of input such as pause, resume, stop, other "trick play" functions or menu navigational input.

In some embodiments, host user interface 102 may access a subscriber viewing history in a profile for the host subscriber in subscriber profile database 190. Subscriber profile database 190 may be an aggregator and/or updater of multiple content delivery services. For instance, subscriber profile database 190 may be able to access, download, and update subscriber watch histories and profiles via corresponding APIs for each service. In some embodiments, subscriber profile database 190 may have subscriber usernames and passwords stored for each individual. In some embodiments, subscriber profile database 190 may have access limited to requesting and updating watch histories as needed, e.g., as a privacy concern.

In scenario 100, host device 101 may emit discovery signal 120 to determine if any guest devices are within range. In some embodiments, discovery signal 120 may be initiated by host device 101. Host user interface 102 may receive, transmit, and/or initiate a discovery request, e.g., discovery signal 120. In some embodiments, discovery signal 120 may be initiated by guest device 110. In some embodiments, a tracking engine may infer that a guest subscriber is consuming content via host device 101 (along with a host subscriber, perhaps) based on discovery of guest device 110, e.g., as determined via discovery signal 120. In scenario 100, guest device 110 is within communicative proximity of host device 101. Discovery signal 120 may be used estimate distances of devices to host device 101, e.g., based on transmission times and/or measurements of strength of signal. Discovery signal 120 may be bidirectional. In some embodiments, discovery signal 120 may be one or more networks using Bluetooth, near-field communication (NFC), radio frequency, IEEE 802.11x (WiFi), or other protocol(s). In some embodiments, discovery signal 120 may create a local area network and/or an ad-hoc network with guest device 110. In some embodiments, discovery signal 120 may include connecting to a common server by, e.g., accessing an activation website communicated by on-screen information, text message, QR codes, infrared, audio, or other communication.

In some embodiments, guest device 110 may respond to discovery signal 120 from host device 101 to acknowledge that a guest device is within range. For instance, host device 101 and guest device 110 may perform a handshake and/or communicate via discovery signal 120. A handshake may be used to exchange information in order to establish a protocol of communication prior to full communication. In some embodiments, guest device 110 may emit discovery signal 120 to determine if any host devices are within range and host device 101 may acknowledge, e.g., via discovery signal 120. In such embodiments, privacy may be a concern, e.g., with subscription usernames and/or billing information, and data may be shared under pseudonyms or encrypted identifications. In some embodiments, host device 101 and guest device 110 may communicate via discovery signal 120. Host device 101 and guest device 110 may also communicate through a remote network, e.g., network 160 via server 160.

For instance, by way of a non-limiting example, a guest subscriber may consume content, such as a movie, with a host subscriber on the host subscriber's television, e.g., host device 101. In such an example, host device 101 may send discovery signal 120 to detect guest devices and estimate their distance from host device 101, which may indicate that a guest subscriber is viewing the playback on host device 101. If a guest device, e.g., guest device 110, responds, host device 101 may transmit an update to the guest device on the progress of the content. In scenario 100, guest device 110 is within communicative proximity of host device 101. In some embodiments, content will have a content identifier (e.g., title 103 or a content ID) and a progress time (e.g., time 104) as it is played, and host device 101 may communicate the content identifier and progress time to guest device 110. In some embodiments, a progress time may be a scene number or start time of a scene.

In cases where guest device 110 receives a content identifier and progress time from host device 101, e.g., via discovery signal 120, then guest device 110 may request an update to a subscriber profile via server 270. Guest device 210 may request an update to a subscriber profile via server 270 at a later time if, for instance, guest device 210 lacks a network connection at the time. In some embodiments, host device 201 may request an update to a subscriber profile via server 270 on behalf of the guest subscriber. For instance, host device 201 may request an update to a guest subscriber's profile via server 270 on behalf of the guest subscriber while host device 201 requests an update to the host subscriber's profile. In such embodiments, privacy may be a concern, and substitute profile identification may be used so that guest subscriber information is not available to a host device.

As shown in scenario 100, guest device 110 generates a graphical user interface, e.g., guest user interface 112. In scenario 100, guest user interface 112 displays information delivered via discovery signal 120 or network 160 through server 170. Guest user interface 112 may display time 114, which indicates progress of 2:15:36 of the runtime 2:32:10. Guest interface 112 may display title 113, which, for example, indicates the content item's title is "Space Wars VIII: The Lost Hero." Guest user interface 112 may access one or more profiles for the guest subscriber in subscriber profile database 190. Guest user interface 112 may display second-screen functions relating to content. In some embodiments, guest user interface 112 may be appear on-screen as a result of information delivered from host device 101 (e.g., via discovery signal 120 and/or network 160). In some embodiments, guest user interface 112 may be enabled as a result of input to host device 101, such as pause, resume, stop, other "trick play" functions or menu navigational input. In some embodiments, guest user interface 112 may receive, transmit, and/or initiate a discovery request, e.g., discovery signal 120.

In some embodiments, guest user interface 112 may display services 116A-C to indicate which content delivery systems (e.g., streaming services) may be updated. Identification of services 116A-C, for instance, may be stored in guest device 110 and/or accessible by guest user interface 112. In some embodiments, display of services 116A-C may indicate confirmation that profiles for the respective services were updated at server 170 and/or subscriber profile database 190.

Figure 2:
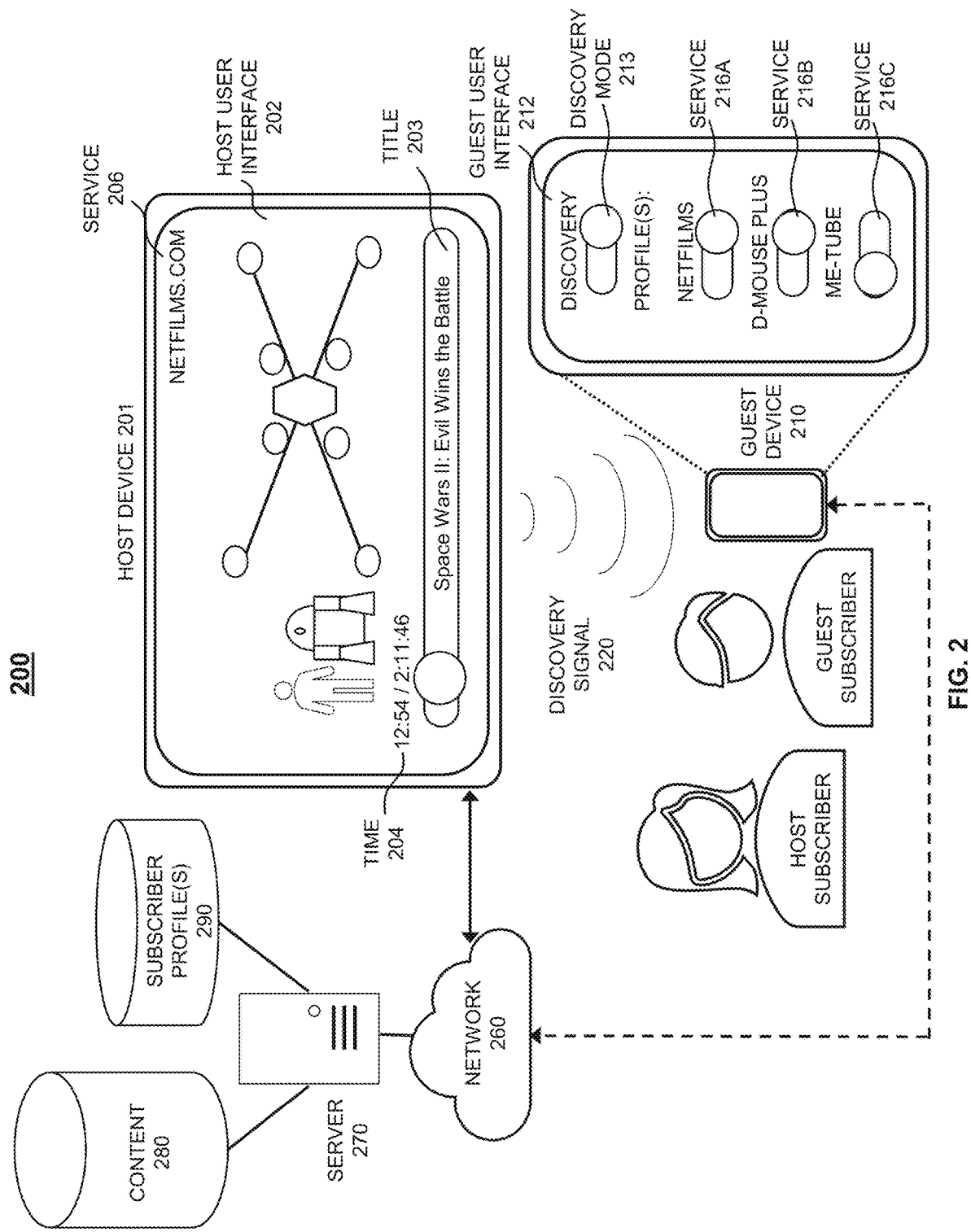
FIG. 2 depicts an illustrative scenario and user interfaces for tracking media content consumed by a guest, in accordance with some embodiments of the disclosure.

FIG. 2 depicts illustrative scenario 200 and user interfaces for tracking media content consumed as a guest, in accordance with some embodiments of the disclosure. Scenario 200 of FIG. 2 illustrates a content delivery system accessible by host device 201 and guest device 210 via network 260. In scenario 200, host device 201 is illustrated as a smart television and guest device 210 is illustrated as a smartphone. By way of a non-limiting example, scenario 200 may depict a selective updating of a guest subscriber's viewing history while the guest is consuming content on a host subscriber's television, based on a communication between the guest's smartphone and the host's television.

Each of host device 201 or guest device 210 may be any suitable device such as a television, personal computer, laptop, smartphone, tablet, media center, video console, or any device as depicted in FIGS. 6 and 7. Host device 201 or guest device 210 should have capabilities to receive input, communicate with a network, and provide content for consumption. Input for host device 201 or guest device 210 may be any suitable input interface. Some embodiments may utilize a tracking engine, e.g., as part of an interactive content guidance application.

As shown in scenario 200, host device 201 generates a graphical user interface, e.g., host user interface 202. In scenario 200, host user interface 202 displays content delivered via network 260 by server 270 from, e.g., content storage 280. Host interface 202 may display time 204, which indicates progress of 12:54 of the runtime, 2:11:46. Host user interface 202 may display title 203, which, for example, indicates the content item's title is "Space Wars II: Evil Wins the Battle." Host user interface 202 may display service 206 to indicate which content delivery system (e.g., a streaming service) is providing the content. In some embodiments, features of host user interface 202 may be enabled as a result of input such as pause, resume, stop, other "trick play" functions or menu navigational input.

In some embodiments, guest user interface 212 may access one or more subscriber viewing histories, e.g., each in a profile for the guest subscriber, in subscriber profile database 290. Subscriber profile database 290 may be an aggregator and/or updater of multiple content delivery services. For instance, subscriber profile database 290 may be able to access, download, and update subscriber watch histories and profiles via corresponding APIs for each service.

In scenario 200, host device 201 may emit discovery signal 220 to determine if any guest devices are within range. In some embodiments, discovery signal 220 may be initiated by host device 201. Host user interface 202 may receive, transmit, and/or initiate a discovery request, e.g., discovery signal 220. In some embodiments, discovery signal 220 may be initiated by guest device 210. In some embodiments, a tracking engine may infer that a guest subscriber is consuming content view host device 201 (along with a host subscriber, perhaps) based on communication with guest device 210, e.g., via discovery signal 220. Discovery signal 220 may be bidirectional. In scenario 200, guest device 210 is within communicative proximity of host device 201.

In some embodiments, discovery signal 220 may include connecting to a common server. In some embodiments, guest device 210 may respond to discovery signal 220 from host device 201 to acknowledge that a guest device is within range and, e.g., perform a handshake and/or communicate via discovery signal 220. In some embodiments, host device 201 and guest device 210 may communicate via discovery signal 220. Host device 201 and guest device 210 may also communicate through a remote network, e.g., network 260 via server 270.

For instance, by way of a non-limiting example, a guest subscriber may consume content, such as a movie, with a host subscriber on the host subscriber's television, e.g., host device 201. In such an example, host device 201 may send discovery signal 220 to detect if any guest devices are around and estimate distances of the devices, which may indicate that a guest subscriber is viewing the playback on host device 201. Discovery signal 220 may be used to determine if guest device 210 is within communicative proximity of host device 201.

In scenario 200, guest device 210 features guest user interface 212, which includes one or more options. For instance, guest user interface 212 includes a toggle for discovery mode 213. In some embodiments, discovery mode 213 may be enabled and, e.g., guest device 210 may respond to discovery signal 220. In some embodiments, discovery mode 213 may be disabled and, e.g., guest device 210 may ignore discovery signal 220. In some embodiments, discovery mode 213 may be partially enabled and, e.g., guest user interface 212 may provide an update before guest device 210 responds to discovery signal 220. In some embodiments a "discovery mode" or "entertainment mode," such as a mode enabled by a toggle for discovery mode 213, may be enabled on a mobile device to allow discovery and/or communication on a local network or a created ad-hoc network. For example, "discovery mode" or "entertainment mode" may enable communication between host device 201 and guest device 210 via network 260 as a part of, in addition to, or instead of communicating via discovery signal 220.

If a guest device, e.g., guest device 210, responds, host device 201 may transmit an update to the guest device on the progress of the content. In some embodiments, host device 201 may communicate the content identifier (e.g., title 203 or a content ID) and a progress time (e.g., time 204), e.g., as it is played, to guest device 210.

In some embodiments, a progress time may be a scene number or start time of a scene. In cases where guest device 210 receives a content identifier and progress time from host device 201, e.g., via discovery signal 220, then guest device 210 may request an update to a subscriber profile via server 270. Guest device 210 may request an update to a subscriber profile via server 270 at a later time if, for instance, guest device 210 lacks a network connection at the time. In some embodiments, host device 201 may request an update to a subscriber profile via server 270 on behalf of the guest subscriber. In scenario 200, for instance, if enabled via guest interface 212, host device 201 may request an update to a guest subscriber's profile via server 270 on behalf of the guest subscriber while host device 201 requests an update to the host subscriber's profile. In such embodiments, privacy may be a concern, and substitute profile identification may be used so that guest subscriber information is not available to a host device.

As shown in scenario 200, guest device 210 generates a graphical user interface, e.g., guest user interface 212. In scenario 200, guest user interface 212 features a discovery mode 213 to enable or disable discovery, e.g., via discovery signal 220. In some embodiments, guest user interface 212 may display services 216A-C to indicate which content delivery systems (e.g., streaming services) may be updated at server 270 and/or subscriber profile database 290. Identification of services 216A-C, for instance, may be stored in guest device 210 and/or accessible by guest user interface 212. In some embodiments, display services 216A-C may only be available because discovery mode 213 is enabled. In some embodiments, each of display services 216A-C may only be available because of the corresponding service hosting the content. In some embodiments, each of display services 216A-C may only be available if the corresponding service is used on host device 201, e.g., service 206.

Guest user interface 212 also features, for example, options for updating services 216A-C. In some embodiments, disabling updating of one or more of services 216A-C may prevent updating of a viewing history or subscriber profile. For instance, if service 216C is disabled, then the viewing history for the corresponding service may not be updated with a content identification and/or progress time. If services 216A-B are enabled, for example, then the viewing history for the corresponding services may be updated with a content identification and/or progress time. In some embodiments, disabling updating of one or more of services 216A-C may only prevent updating one of content identification and/or progress time of a viewing history or subscriber profile. For instance, updating may only be enabled for completed programs and not partially consumed content.

Guest user interface 212 may access one or more profiles (or limited information from such profiles) for the guest subscriber in subscriber profile database 290. In some embodiments, guest user interface 212 may appear on-screen as a result of information delivered from host device 201 (e.g., via discovery signal 220 and/or network 260). In some embodiments, features of guest user interface 212 may be enabled as a result of input to guest device 210. In some embodiments, guest user interface 212 may receive, transmit, and/or initiate a discovery request, e.g., discovery signal 220.

Figure 3:
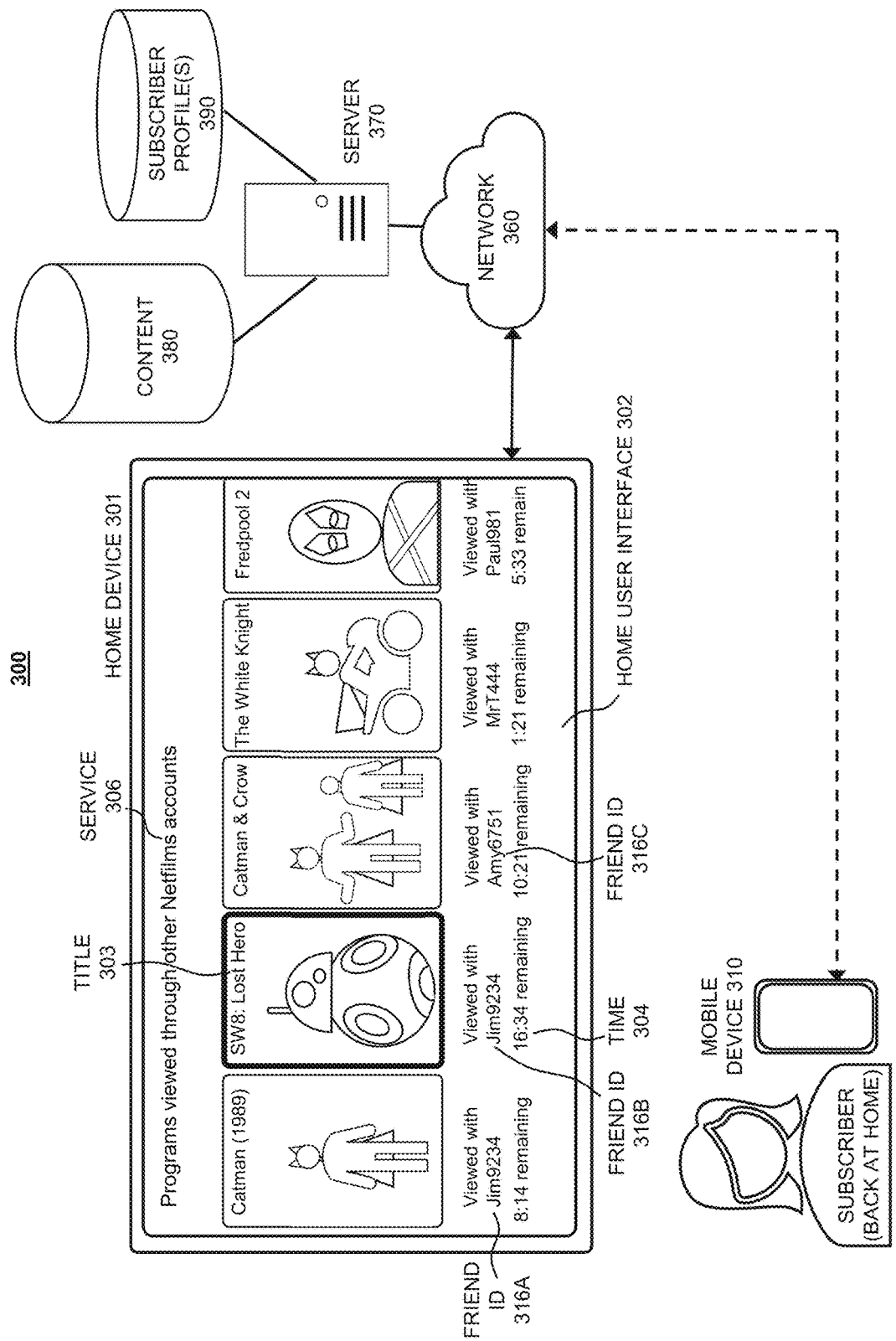
FIG. 3 depicts an illustrative scenario and user interface for tracking media content consumed as a guest, in accordance with some embodiments of the disclosure.

FIG. 3 depicts illustrative scenario 300 and user interfaces for tracking media content consumed as a guest, in accordance with some embodiments of the disclosure. Scenario 300 of FIG. 3 illustrates a content delivery system accessible by host device 301 and guest device 310 via network 360. In scenario 300, home device 301 is illustrated as a smart television and mobile device 310 is illustrated as a smartphone. By way of a non-limiting example, scenario 300 may depict consuming content on a subscriber's television (at home) after updating a guest subscriber's viewing history based on consuming content on a prior host's television (outside home).

Each of home device 301 or mobile device 310 may be any suitable device such as a television, personal computer, laptop, smartphone, tablet, media center, video console, or any device as depicted in FIGS. 6 and 7. Home device 301 or mobile device 310 should have capabilities to receive input, communicate with a network, and provide content for consumption. Input for home device 301 or mobile device 310 may be any suitable input interface. Some embodiments may utilize a tracking engine, e.g., as part of an interactive content guidance application.

As shown in scenario 300, home device 301 generates a graphical user interface, e.g., home user interface 302. In scenario 300, home user interface 302 displays an interface to select content delivered via network 360 by server 370 from, e.g., content storage 380. Home user interface 302 may display service 306 to indicate which content delivery system (e.g., a streaming service) is providing the content. In scenario 300, multiple services may provide content, and home user interface 302 may function as a content delivery aggregator that links to each service. In some embodiments, appearance of home user interface 302 may occur as a result of input such as pause, stop, or menu navigational input.

In scenario 300, home user interface 302 depicts content items that are able to be selected and consumed. Scenario 300 may occur after updating a viewing history in, for example, scenario 100 (or scenario 200). For instance, home user interface 302 depicts a content item and time as updated from scenario 100.

In some embodiments, home user interface 302 may access one or more subscriber viewing histories, e.g., in a profile for each subscriber, in subscriber profile database 390. Subscriber profile database 390 may be an aggregator and/or updater of multiple content delivery services. For instance, subscriber profile database 390 may be able to access, download, and update subscriber watch histories and profiles via corresponding APIs for each service.

In scenario 300, host interface 302 may display title 303, which, for example, indicates the content item's title is "Space Wars VIII: The Lost Hero" or an abbreviation of the title. Home user interface 302 may display time 304, which indicates there are 16 minutes and 34 seconds of runtime remaining. Scenario 300 may occur after scenario 100 where host user interface 102, on host device 101, displayed time 104 indicating a progress of 2:15:36 of the runtime 2:32:10 and title 103, which indicated the content item's title was "Space Wars VIII: The Lost Hero."

In some embodiments, content items available to be selected and consumed may indicate an identification of another subscriber who previously consumed the content simultaneously. In scenario 300, host interface 302 may display friend ID 316A-C to indicate with whom a subscriber previously viewed a program. For example, the content item with title 303 ("Space Wars VIII: The Lost Hero") may have been viewed in scenario 100 with host ID 316B, "Jim9234." Information describing display friend ID 316A-C may be accessed by home device 301 or mobile device 310 via network 360 accessing server 370 and/or subscriber profile(s) 390. Such information could be updated in scenario 11 (or scenario 200) along with the content identification and the progress time but also may be accessed via content access time data, social networking, or other records.

In some embodiments, home device 301 may emit a discovery signal to determine if any mobile devices are within range. Home device 301 may or may not communicate or connect directly with mobile device 310, e.g., using a discovery signal. In some embodiments, as content is consumed via home user interface 302, home device 301 may request an update to a subscriber profile via server 370.

Figure 4:
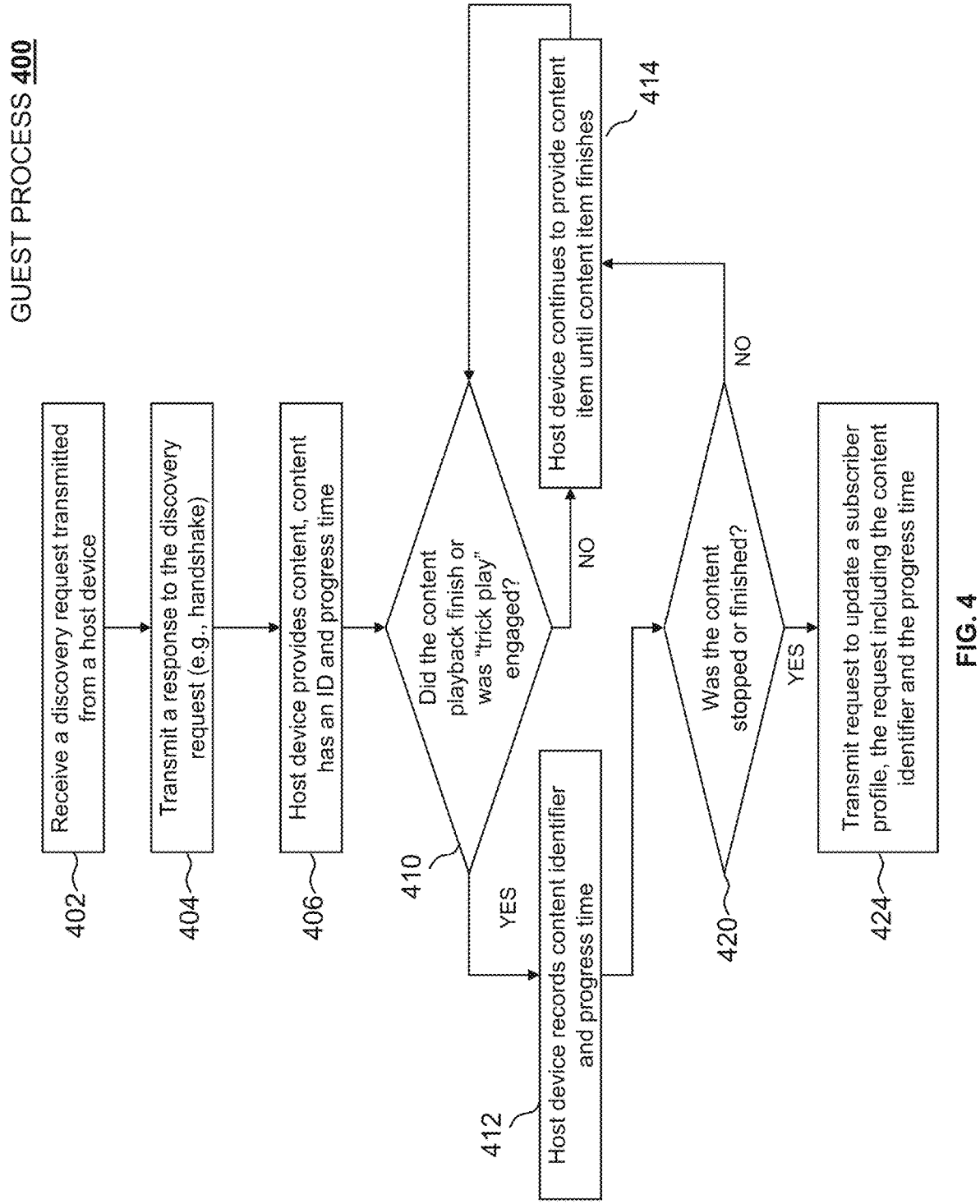
FIG. 4 depicts an illustrative flowchart of a process for tracking media content consumed as a guest, in accordance with some embodiments of the disclosure.

FIG. 4 depicts an illustrative flowchart of a process for tracking media content consumed as a guest, in accordance with some embodiments of the disclosure. Some embodiments may utilize a tracking engine, e.g., as part of an interactive content guidance application, stored and executed by one or more of the processors and memory of a host device, guest device, and/or server.

At step 402, a tracking engine on a guest device receives a discovery request transmitted from a host device. For instance, in scenario 100 of FIG. 1, host device 101 may emit discovery signal 120 to determine if any guest devices are within range, and guest device 110 may receive discovery signal 120. In some embodiments, discovery signal 120 may create a local area network and/or an ad-hoc network with guest device 110.

At step 404, the tracking engine at the guest device transmits a response to the discovery request (e.g., handshake). For instance, in scenario 100, guest device 110 may respond to discovery signal 120 from host device 101 to acknowledge that a guest device is within range. In some embodiments, host device 101 and guest device 110 may perform a handshake and/or communicate via discovery signal 120. A host device and guest device may also communicate through a remote network and server.

At step 406, the host device provides content that is associated with a content identifier (e.g., content ID) and progress time. For instance, in scenario 100, a video titled "Space Wars VIII: The Lost Hero" is depicted, and a progress time of 2:15:36 of the runtime 2:32:10 is indicated. A content identifier need not be a title and may include, for example, an ID number, a filename, a series number, an episode number, a date and/or time, or other identifying information. Such information may be stored as metadata with content and/or accessed from a separate database. In some embodiments, such as scenario 100, host device 101 may stream content from content storage 180 via server 170 and network 160. Host device 101 may play back content previously downloaded or recorded from, e.g., content storage 180 via server 170 and network 160.

At step 410, the host device determines if a "trick play" or "trick mode" function has been engaged or if the content has otherwise finished playback. Typically, the host device may receive a command to initiate a trick play function such as pause, play, stop, fast-forward, rewind, skip forward, skip back, or others. In some embodiments, a trick play command may be received as input from a remote control, touch-screen, and/or voice recognition system.

At step 412, in response to determining that a "trick play" function was initiated, the host device records the content identifier and current progress time. In some embodiments, the host device records a real-time timestamp with the content identifier and current progress time in order to identify a most up-to-date progress time. It may not be necessary to store anything but the most recent content identifier and progress time; however, a log of progress times may be beneficial as, e.g., audience metrics.

At step 420, the host device determines if the content playback has been either stopped or finished. For instance, the host device may return to a prior menu when the content item is complete or otherwise stopped prior to completion. The host device may have only changed playback, e.g., skipped back or paused, when a trick play function was invoked. In some embodiments, it may be more efficient, for instance, to store the most recent progress time with every (trick play) input but to transmit a request to update a remote profile only when the content item is stopped. For instance, if fast-forward mode is input, the latest progress time may be stored locally at host device 101, but the progress time in a viewing history or profile may not be updated until either the content item is completed or the viewing session is stopped.

If the content has not stopped or finished, then, at step 414, the host device continues to provide the content item until it is completed or stopped. For instance, in scenario 100, host device 110 may play back content until the content item is completed. Host device 110 may play back content until there is a manual stop command. Host device 110 may play back content until there is an automatic stop command, such as a time-out after content is paused.

Once the host device determines the content was stopped or is finished, e.g., at step 420, then, at step 424, the tracking engine on a guest device transmits a request to update a subscriber profile with the content identifier and the most recently stored progress time. For instance, in scenario 100, guest device 110 may request server 170 and/or subscriber profile database 190 to update a subscriber profile with the content identifier and latest progress time. In some embodiments, the tracking engine on a guest device may wait to transmit a request to update the subscriber profile until the connection to the network is established and/or stronger. For example, in scenario 100, guest device 110 may use WiFi or 4G/LTE to request server 170 and/or subscriber profile database 190 to update the subscriber profile with the content identifier and latest progress time, but in the event that WiFi or 4G/LTE is not available, guest device 110 may wait to transmit the request until the device is connected to, e.g., a preferred network. In some embodiments, the tracking engine on a guest device may transmit a request to update the subscriber profile via the host device. For example, in scenario 100, guest device 110 may use discovery signal 120 to ask host device 201 to relay a request to server 170 and/or subscriber profile database 190 to update the subscriber profile with the content identifier and latest progress time. In such an embodiment, guest device 110 may be unaware of the content identifier or latest progress time.

Figure 5:
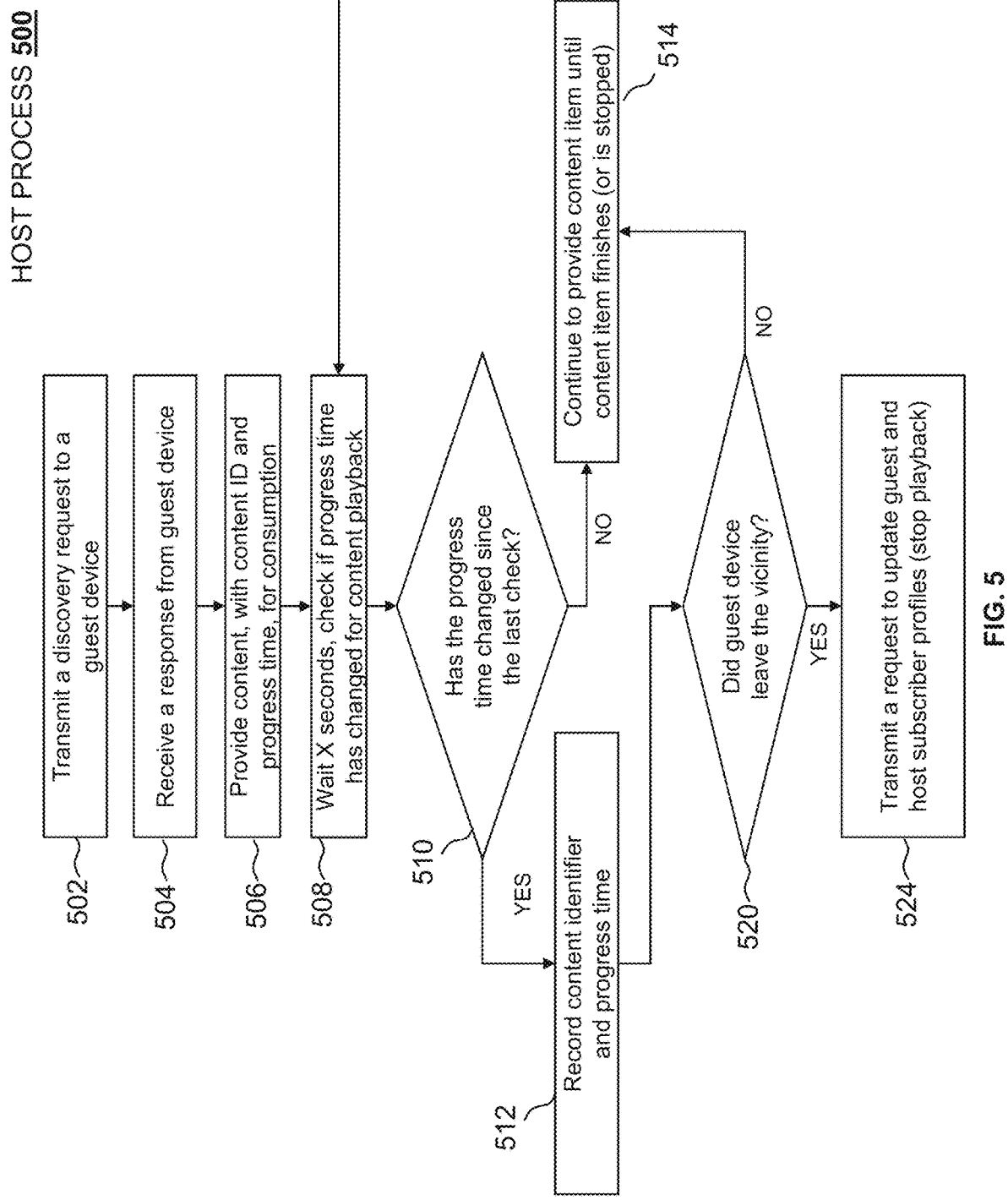
FIG. 5 depicts an illustrative flowchart of a process for tracking media content consumed as a guest, in accordance with some embodiments of the disclosure.

FIG. 5 depicts an illustrative flowchart of a process for tracking media content consumed as a guest, in accordance with some embodiments of the disclosure. Some embodiments may utilize a tracking engine, e.g., as part of an interactive content guidance application, stored and executed by one or more of the processors and memory of a host device, guest device, and/or server.

At step 502, a tracking engine at a host device transmits a discovery request transmitted to a guest device. For instance, in scenario 100 of FIG. 1, host device 101 may emit discovery signal 120 to determine if any guest devices are within range, and guest device 110 may receive discovery signal 120. In some embodiments, discovery signal 120 may create a local area network and/or an ad-hoc network with guest device 110.

At step 504, the tracking engine at the host device receives a response to the discovery request (e.g., handshake) from the guest device. For instance, in scenario 100, guest device 110 may respond to discovery signal 120 from host device 101 to acknowledge that it is within range. In some embodiments, host device 101 and guest device 110 may perform a handshake and/or communicate via discovery signal 120. A host device and guest device may also communicate through a remote network and server. In some embodiments, due to privacy concerns, the guest device may communicate encrypted device or subscriber identification, unreadable by a host device, but able to be relayed to the server.

At step 506, the tracking engine at the host device provides content that is associated with a content identifier (e.g., content ID) and progress time. For instance, in scenario 100, host device 101 receives content from content storage 180 via server 170 and network 160 prior to or while providing the content. In scenario 100, a video titled "Space Wars VIII: The Lost Hero" is depicted, and a progress time of 2:15:36 of the runtime 2:32:10 is indicated. A content identifier need not be a title and may include, for example, an ID number, a filename, a series number, an episode number, a date and/or time, or other identifying information. Such information may be stored as metadata with content and/or accessed from a separate database.

At step 508, the tracking engine at the host device periodically checks if the progress time has changed for content playback. For instance, the host device may wait every 90 seconds in real time and check if the progress time has changed while providing the content item. In some embodiments, the host device may wait every X seconds in real time before checking for a change in progress time of the content playback, where X may be a time based on a fraction of the content runtime. For example, one-twentieth of a 100-minute program would be a check every 5 minutes.

At step 510, the host device determines if the progress time has changed for content playback since the prior check. If there has not been a prior check, the "YES" path should be taken to establish a first progress time. If the content has been stopped, the "YES" path should be taken as well.

At step 512, in response to determining that the progress time has changed for content playback since the prior check, the tracking engine at the host device records the content identifier and current progress time. In some embodiments, the host device records a real-time timestamp with the content identifier and current progress time in order to identify a most up-to-date progress time. In some embodiments, a small change in progress time may not qualify as a change. This might be done to, e.g., limit the frequency new progress times are recorded. This could also be done to be more conservative on a resumed starting position should the content be exited and resumed later. For example, a change in 3% of the total time might not be considered a change. For example, a change fewer than 5 minutes might not be considered a change. For example, a change of progress time that falls within the same scene of the content might not be considered a change.

If the progress time has not changed for content playback since the prior check, then, at step 514, the host device continues to provide the content item until completed or stopped. For instance, if the content is paused, there may be no need to update a progress time. In some embodiments, recording a timestamp for no change in progress time may be beneficial; however, many content delivery systems have a time-out function or a screensaver function that would automatically stop presentation after, e.g., 5 minutes of pause. In scenario 100, host device 101 may play back content until the content item is completed. Host device 101 may play back content until there is a manual stop command. Host device 101 may play back content until there is an automatic stop command, such as a time-out after content is paused.

At step 520, the tracking engine at the host device checks if the guest device is still in the vicinity. For example, in scenario 100, host device 101 may transmit a discovery request via discovery signal 120 to guest device 110 at an interval such as the same interval for checking changes to progress time, and, if guest device 110 fails to respond, then host device 101 may request an update with the content identification and progress time for the guest subscriber.

Once the host device determines the content was stopped or is finished, e.g., at step 520, then, at step 524, the tracking engine on a guest device transmits a request to update a subscriber profile with the content identifier and the most recently stored progress time. For instance, in scenario 100, guest device 110 may request server 170 and/or subscriber profile database 190 to update a subscriber profile with the content identifier and latest progress time. In some embodiments, the tracking engine on a guest device may wait to transmit a request to update the subscriber profile until the connection to the network is established and/or stronger. For example, in scenario 100, guest device 110 may use WiFi or 4G/LTE to request server 170 and/or subscriber profile database 190 to update the subscriber profile with the content identifier and latest progress time, but in the event that WiFi or 4G/LTE is not available, guest device 110 may wait until the device is connected to, e.g., a preferred network. In some embodiments, the tracking engine on a guest device may transmit a request to update the subscriber profile via the host device. For example, in scenario 100, guest device 110 may use discovery signal 120 to ask host device 201 to relay a request to server 170 and/or subscriber profile database 190 to update the subscriber profile with the content identifier and latest progress time. In such an embodiment, guest device 110 may be unaware of the content identifier or latest progress time.

FIG. 6 shows a generalized embodiment of illustrative device 600. As referred to herein, device 600 should be understood to mean any device that can receive input from one or more other devices, one or more network-connected devices, one or more electronic devices having a display, or any device that can provide content for consumption. As depicted in FIG. 6, device 600 is a smartphone, however, device 600 is not limited to smartphones and/or may be any computing device. For example, device 600 of FIG. 6 can be in system 700 of FIG. 7 as device 702, including but not limited to a smartphone, a smart television, a tablet, a microphone (e.g., with voice control or a virtual assistant), a computer, or any combination thereof, for example.

Device 600 may be implemented by a device or system, e.g., a device providing a display to a user, or any other suitable control circuitry configured to generate a display to a user of content. For example, device 600 of FIG. 6 can be implemented as equipment 601. In some embodiments, equipment 601 may include set-top box 616 that includes, or is communicatively coupled to, display 612, audio equipment 614, and user input interface 610. In some embodiments, display 612 may include a television display or a computer display. In some embodiments, user interface input 610 is a remote-control device. Set-top box 616 may include one or more circuit boards. In some embodiments, the one or more circuit boards include processing circuitry, control circuitry, and storage (e.g., RAM, ROM, Hard Disk, Removable Disk, etc.). In some embodiments, circuit boards include an input/output path. Each one of device 600 and equipment 601 may receive content and receive data via input/output (hereinafter "I/O") path 602. I/O path 602 may provide content and receive data to control circuitry 604, which includes processing circuitry 606 and storage 608. Control circuitry 604 may be used to send and receive commands, requests, and other suitable data using I/O path 602. I/O path 602 may connect control circuitry 604 (and specifically processing circuitry 606) to one or more communication paths (described below). I/O functions may be provided by one or more of these communication paths but are shown as a single path in FIG. 6 to avoid overcomplicating the drawing. While set-top box 616 is shown in FIG. 6 for illustration, any suitable computing device having processing circuitry, control circuitry, and storage may be used in accordance with the present disclosure. For example, set-top box 616 may be replaced by, or complemented by, a personal computer (e.g., a notebook, a laptop, a desktop), a smartphone (e.g., device 600), a tablet, a network-based server hosting a user-accessible client device, a non-user-owned device, any other suitable device, or any combination thereof.

Control circuitry 604 may be based on any suitable processing circuitry such as processing circuitry 606. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 604 executes instructions for an application tracking engine stored in memory (e.g., storage 608). Specifically, control circuitry 604 may be instructed by the application to perform the functions discussed above and below. For example, the application may provide instructions to control circuitry 604 to generate the content guidance displays. In some implementations, any action performed by control circuitry 604 may be based on instructions received from the application.

In some client/server-based embodiments, control circuitry 604 includes communications circuitry suitable for communicating with an application server. A tracking engine may be a stand-alone application implemented on a device or a server. A tracking engine may be implemented as software or a set of executable instructions. The instructions for performing any of the embodiments discussed herein of the tracking engine may be encoded on non-transitory computer-readable media (e.g., a hard drive, random-access memory on a DRAM integrated circuit, read-only memory on a BLU-RAY disk, etc.) or transitory computer-readable media (e.g., propagating signals carrying data and/or instructions). For example, in FIG. 6, the instructions may be stored in storage 608, and executed by control circuitry 604 of a device 600.

In some embodiments, a tracking engine may be a client/server application where only the client application resides on device 600 (e.g., device 702), and a server application resides on an external server (e.g., server 706). For example, a tracking engine may be implemented partially as a client application on control circuitry 604 of device 600 and partially on server 706 as a server application running on control circuitry. Server 706 may be a part of a local area network with device 702 or may be part of a cloud computing environment accessed via the internet. In a cloud computing environment, various types of computing services for performing searches on the internet or informational databases, providing storage (e.g., for the keyword-topic database) or parsing data are provided by a collection of network-accessible computing and storage resources (e.g., server 706), referred to as "the cloud." Device 600 may be a cloud client that relies on the cloud computing capabilities from server 706 to determine times, identify one or more content items, and provide content items by the tracking engine. When executed by control circuitry of server 706, the tracking engine may instruct the control circuitry to generate the tracking engine output (e.g., content items and/or indicators) and transmit the generated output to device 702. The client application may instruct control circuitry of the receiving device 702 to generate the tracking engine output. Alternatively, device 702 may perform all computations locally via control circuitry 604 without relying on server 706.

Control circuitry 604 may include communications circuitry suitable for communicating with a tracking engine server, a quotation database server, or other networks or servers. The instructions for carrying out the above-mentioned functionality may be stored and executed on the application server 706. Communications circuitry may include a cable modem, an integrated-services digital network (ISDN) modem, a digital subscriber line (DSL) modem, a telephone modem, an ethernet card, or a wireless modem for communications with other equipment, or any other suitable communications circuitry. Such communications may involve the internet or any other suitable communication network or paths. In addition, communications circuitry may include circuitry that enables peer-to-peer communication of devices, or communication of devices in locations remote from each other.

Memory may be an electronic storage device such as storage 608 that is part of control circuitry 604. As referred to herein, the phrase "electronic storage device" or "storage device" should be understood to mean any device for storing electronic data, computer software, or firmware, such as random-access memory, read-only memory, hard drives, optical drives, solid state devices, quantum storage devices, gaming consoles, gaming media, or any other suitable fixed or removable storage devices, and/or any combination of the same. Storage 608 may be used to store various types of content described herein as well as content guidance data described above. Nonvolatile memory may also be used (e.g., to launch a boot-up routine and other instructions). Cloud-based storage, for example, (e.g., on server 706) may be used to supplement storage 608 or instead of storage 608.

A user may send instructions to control circuitry 604 using user input interface 610. User input interface 610, display 612 may be any suitable interface such as a touchscreen, touchpad, or stylus and/or may be responsive to external device add-ons, such as a remote control, mouse, trackball, keypad, keyboard, joystick, voice recognition interface, or other user input interfaces. Display 610 may include a touchscreen configured to provide a display and receive haptic input. For example, the touchscreen may be configured to receive haptic input from a finger, a stylus, or both. In some embodiments, equipment device 600 may include a front-facing screen and a rear-facing screen, multiple front screens, or multiple angled screens. In some embodiments, user input interface 610 includes a remote-control device having one or more microphones, buttons, keypads, any other components configured to receive user input or combinations thereof. For example, user input interface 610 may include a handheld remote-control device having an alphanumeric keypad and option buttons. In a further example, user input interface 610 may include a handheld remote-control device having a microphone and control circuitry configured to receive and identify voice commands and transmit information to set-top box 616.

Audio equipment 610 may be integrated with or combined with display 612. Display 612 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 612. Speakers 614 may be provided as integrated with other elements of each one of device 600 and equipment 601 or may be stand-alone units. An audio component of videos and other content displayed on display 612 may be played through speakers of audio equipment 614. In some embodiments, audio may be distributed to a receiver (not shown), which processes and outputs the audio via speakers of audio equipment 614. In some embodiments, for example, control circuitry 604 is configured to provide audio cues to a user, or other audio feedback to a user, using speakers of audio equipment 614. Audio equipment 614 may include a microphone configured to receive audio input such as voice commands or speech. For example, a user may speak letters or words that are received by the microphone and converted to text by control circuitry 604. In a further example, a user may voice commands that are received by a microphone and recognized by control circuitry 604.

An application (e.g., for generating a display) may be implemented using any suitable architecture. For example, a stand-alone application may be wholly implemented on each one of device 600 and equipment 601. In some such embodiments, instructions of the application are stored locally (e.g., in storage 608), and data for use by the application is downloaded on a periodic basis (e.g., from an out-of-band feed, from an Internet resource, or using another suitable approach). Control circuitry 604 may retrieve instructions of the application from storage 608 and process the instructions to generate any of the displays discussed herein. Based on the processed instructions, control circuitry 604 may determine what action to perform when input is received from input interface 610. For example, movement of a cursor on a display up/down may be indicated by the processed instructions when input interface 610 indicates that an up/down button was selected. An application and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media card, register memory, processor cache, Random Access Memory (RAM), etc.

Control circuitry 604 may allow a user to provide user profile information or may automatically compile user profile information. For example, control circuitry 604 may monitor the words the user inputs in his/her messages for keywords and topics. In some embodiments, control circuitry 604 monitors user inputs such as texts, calls, conversation audio, social media posts, etc., to detect keywords and topics. Control circuitry 604 may store the detected input terms in a keyword-topic database and the keyword-topic database may be linked to the user profile. Additionally, control circuitry 604 may obtain all or part of other user profiles that are related to a particular user (e.g., via social media networks), and/or obtain information about the user from other sources that control circuitry 604 may access. As a result, a user can be provided with a unified experience across the user's different devices.

In some embodiments, the application is a client/server-based application. Data for use by a thick or thin client implemented on each one of device 600 and equipment 601 is retrieved on-demand by issuing requests to a server remote from each one of device 600 and equipment 601. For example, the remote server may store the instructions for the application in a storage device. The remote server may process the stored instructions using circuitry (e.g., control circuitry 604) and generate the displays discussed above and below. The client device may receive the displays generated by the remote server and may display the content of the displays locally on device 600. This way, the processing of the instructions is performed remotely by the server while the resulting displays (e.g., that may include text, a keyboard, or other visuals) are provided locally on device 600. Device 600 may receive inputs from the user via input interface 610 and transmit those inputs to the remote server for processing and generating the corresponding displays. For example, device 600 may transmit a communication to the remote server indicating that an up/down button was selected via input interface 610. The remote server may process instructions in accordance with that input and generate a display of the application corresponding to the input (e.g., a display that moves a cursor up/down). The generated display is then transmitted to device 600 for presentation to the user.

As depicted in FIG. 7, device 702 may be coupled to communication network 704. Communication network 704 may be one or more networks including the internet, a mobile phone network, mobile voice or data network (e.g., a 4G or LTE network), cable network, public switched telephone network, Bluetooth, or other types of communication network or combinations of communication networks. Thus, device 702 may communicate with server 706 over communication network 704 via communications circuitry described above. In should be noted that there may be more than one server 706, but only one is shown in FIG. 7 to avoid overcomplicating the drawing. The arrows connecting the respective device(s) and server(s) represent communication paths, which may include a satellite path, a fiber-optic path, a cable path, a path that supports internet communications (e.g., IPTV), free-space connections (e.g., for broadcast or other wireless signals), or any other suitable wired or wireless communications path or combination of such paths.

In some embodiments, the application is downloaded and interpreted or otherwise run by an interpreter or virtual machine (e.g., run by control circuitry 604). In some embodiments, the application may be encoded in the ETV Binary Interchange Format (EBIF), received by control circuitry 604 as part of a suitable feed, and interpreted by a user agent running on control circuitry 604. For example, the application may be an EBIF application. In some embodiments, the application may be defined by a series of JAVA-based files that are received and run by a local virtual machine or other suitable middleware executed by control circuitry 604.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method of tracking content consumed by a guest subscriber consuming content delivered to a host device associated with a host subscriber account, the method comprising:

receiving, via a guest device associated with a guest subscriber account for the guest subscriber and not associated with the host subscriber account, a request to place the guest device into a discovery mode;

in response to receiving the request to place the guest device into the discovery mode, enabling the guest device to receive a discovery signal from the host device;

receiving, by the guest device, content metadata corresponding to content received by the host device and based on playback of the content by the host device; and transmitting, by the guest device, a request to update a guest subscriber profile associated with the guest subscriber account, the request comprising the content metadata.

2. The method of claim 1, wherein the discovery signal comprises an audio signal output by the host device.

3. The method of claim 1, further comprising:
in response to receiving the discovery signal from the host device, transmitting, by the guest device, a response to the discovery signal via at least one of Bluetooth or NFC or radio frequency or IEEE 802.11x.

4. The method of claim 1, further comprising:
in response to receiving the request to place the guest device into the discovery mode, requesting, by the guest device from the host device, the discovery signal.

5. The method of claim 1, wherein the content metadata comprises a content identifier and a progress time, the content identifier corresponding to the content received by the host device and the progress time generated based on the playback of the content by the host device.

6. The method of claim 1 further comprising:
receiving, via the guest device, a selection of a content delivery service;
determining that the content is available via the selected content delivery service; and
transmitting a request to update the guest subscriber profile associated with the guest subscriber account for the selected content delivery service based on the content metadata.

7. The method of claim 6, wherein the selection of the content delivery service is a selection of a first content delivery service, the method further comprising:
receiving, via the guest device, a selection of a second content delivery service;
determining that the content is available via the first selected content delivery service and via the second selected content delivery service; and
transmitting a request to update the guest subscriber profile associated with the guest subscriber account for the each of the first selected content delivery service and the second selected content delivery service based on the content metadata.

8. The method of claim 1, the method further comprising:
accessing, by a second guest device, the content metadata; and
providing, by the second guest device, the content metadata via a user interface of the second guest device.

9. The method of claim 8, wherein accessing the content metadata further comprises accessing a host subscriber identifier corresponding to the host subscriber account, and providing the content via the user interface of the second guest device further comprises providing the host subscriber identifier with the content metadata via the user interface of the second guest device.

10. The method of claim 1, wherein transmitting the request to update the guest subscriber profile further comprises transmitting a second request to update a second guest subscriber profile associated with the guest device, the request comprising the content metadata.

11. A system for tracking content consumed by a guest subscriber consuming content delivered to a host device associated with a host subscriber account, the system comprising:
input/output circuitry of a guest device associated with a guest subscriber account for the guest subscriber and not associated with the host subscriber account configured to receive a request to place the guest device into a discovery mode; and
processing circuitry configured to, in response to receiving the request to place the guest device into the discovery mode, enable the guest device to receive a discovery signal from the host device;
wherein the input/output circuitry is further configured to:
receive content metadata corresponding to content received by the host device and based on playback of the content by the host device; and
transmit a request to update a guest subscriber profile associated with the guest subscriber account, the request comprising the content metadata.

12. The system of claim 11, wherein the discovery signal comprises an audio signal output by the host device.

13. The system of claim 11, wherein the input/output circuitry is further configured to:
in response to receiving the discovery signal from the host device, transmit a response to the discovery signal via at least one of Bluetooth or NFC or radio frequency or IEEE 802.11x.

14. The system of claim 11, wherein the input/output circuitry is further configured to:
in response to receiving the request to place the guest device into the discovery mode, request the discovery signal from the host device.

15. The system of claim 11, wherein the content metadata comprises a content identifier and a progress time, the content identifier corresponding to the content received by the host device and the progress time generated based on the playback of the content by the host device.

16. The system of claim 11, wherein:
the input/output circuitry is further configured to receive a selection of a content delivery service; and
the processing circuitry is further configured to determine that the content is available via the selected content delivery service,
wherein the input/output circuitry is further configured to transmit a request to update the guest subscriber profile associated with the guest subscriber account for the selected content delivery service based on the content metadata.

17. The system of claim 16, wherein the selection of the content delivery service is a selection of a first content delivery service, and wherein:
the input/output circuitry is further configured to receive a selection of a second content delivery service; and
the processing circuitry is further configured to determine that the content is available via the first selected content delivery service and via the second selected content delivery service,
wherein the input/output circuitry is further configured to transmit a request to update the guest subscriber profile associated with the guest subscriber account for the each of the first selected content delivery service and the second selected content delivery service based on the content metadata.

18. The system of claim 11, wherein the input/output circuitry is further configured to transmit a second request to update a second guest subscriber profile associated with the guest device, the request comprising the content metadata.

19. A non-transitory computer-readable medium having instructions encoded thereon that when executed by control circuitry cause the control circuitry to:
receive, via a guest device associated with a guest subscriber account for a guest subscriber and not associated with a host subscriber account, a request to place the guest device into a discovery mode;

in response to receiving the request to place the guest device into the discovery mode, enable the guest device to receive a discovery signal from a host device;

receive, by the guest device, content metadata corresponding to content received by the host device and based on playback of the content by the host device; and transmit, by the guest device, a request to update a guest subscriber profile associated with the guest subscriber account, the request comprising the content metadata.

20. The non-transitory computer-readable medium of claim 19, the instructions further causing the control circuitry to:

receive, via the guest device, a selection of a content delivery service;

determine that the content is available via the selected content delivery service; and transmit a request to update the guest subscriber profile associated with the guest subscriber account for the selected content delivery service based on the content metadata.

\* \* \* \* \*